United States Patent [19]

Scott et al.

[11] 4,258,976
[45] Mar. 31, 1981

[54] DEROTATION PLATE

[75] Inventors: David A. Scott; Lyman F. Van Buskirk, both of Ridgecrest, Calif.

[73] Assignee: The United States of America as represented by the Secretary of the Navy, Washington, D.C.

[21] Appl. No.: 958,231

[22] Filed: Nov. 6, 1978

[51] Int. Cl.³ .................................................. G02B 5/16
[52] U.S. Cl. ................................................... 350/96.20
[58] Field of Search ...................... 350/96.20; 250/227

[56] References Cited

U.S. PATENT DOCUMENTS

| | | | |
|---|---|---|---|
| 3,428,812 | 2/1969 | Burke | 250/203 |
| 3,586,413 | 6/1971 | Adams | 350/7 |
| 3,628,039 | 12/1971 | Ochs | 250/239 |
| 3,629,590 | 12/1971 | Case | 250/208 |
| 3,663,822 | 5/1972 | Uchida | 250/217 S |
| 3,977,793 | 8/1976 | Trotta | 356/218 |
| 4,027,945 | 6/1977 | Iverson | 350/96.20 |

*Primary Examiner*—Stewart J. Levy
*Attorney, Agent, or Firm*—R. S. Sciascia; W. Thom Skeer; Kenneth G. Pritchard

[57] ABSTRACT

A derotation plate for information transmission between a rotating body and a stationary body. A half-speed carrier is mounted on the rotating body. This rotates at half the speed of the rotating body. The derotation plate which functions similar to a Dove prism or K-mirror is rotated by the half-speed carrier. The derotation plate rotates at half-speed and inverts a rotating matrix of electric, optical or hydraulic signals. The inverted image from the derotation plate is projected on the stationary body as a nonrotating image matrix.

10 Claims, 9 Drawing Figures

A

B

C

DEROTATION PLATE

BACKGROUND OF THE INVENTION

This invention relates to information transmission between moving objects and stationary objects. In particular, this invention relates to information arrays between rotating bodies and stationary bodies.

There are numerous reasons that why it is preferable to rotate objects. Such reasons include spin stabilized nose-cones of missiles and tracking radars. The rotating members of these items generate information which is frequently two-dimensional.

Slip rings are the traditional solution to transmit information from the rotating member to a stationary member. A separate slip ring is required for each channel of information to be coupled from the rotating body to the stationary body. Slip ring assemblies provide information linearly proportional to the diameter of the assembly. Assemblies consist of multiple slip rings concentrically mounted. They are stacked to avoid large diameters. The present invention provides information directly proportional to the number of discrete elements in the derotation assembly which is the area of a circle. Thus doubling the diameter in the present invention provides four times as much signal capability as compared to doubling the diameter of a slip ring assembly which only doubles the signal capability. The number of slip rings required for current signal requirements can be over one hundred. The maintenance problems of such devices emphasize the need for an alternate method to the slip ring approach.

Prior art patents, such as U.S. Pat. Nos. 3,428,812 to Burke, 3,586,413 to Adams and 3,977,793 to Trotta, have attempted to provide methods of maintaining stable two-dimensional readout. The patent to Burke used a Dove prism in counterrotating apparatus designed for satellite observations. The patent to Adams requires a looping path to go between surfaces. The patent to Trotta uses a derotating prism to transmit optical signals. All of these prior devices use a half-speed ratio for derotating the final information. Unfortunately, all of these devices are design limited to a specific application.

It is therefor an object of this invention to provide an apparatus that will transmit any type of information between a rotating member and a stationary member with only minor variations in specific components of the apparatus.

SUMMARY OF THE INVENTION

The present invention functions with a bundle mounted in a rotating member. The bundle can either generate the predetermined information, such as photoelectric response to light, or merely be a conduit for signals from a signal generator. In general, the bundle provides an array of two-dimensional information. At the end of the bundle, means for transmitting the information is provided. The type of means depends on whether the information is to be transmitted as electrical, optical or hydraulic signals.

Mounted to the rotating member is a half-speed carrier. By any of the well-known gearing techniques, this carrier rotates at half the speed of the rotating member. The half-speed carrier supports a derotation plate. This plate accepts the transmitted signal and inverts it about a single axis. The combination of inversion and half-speed rotation results in a steady nonrotating output signal from the derotation plate.

A receiving bundle connected to a stationary member receives this steady signal for two-dimensional processing. The receiving bundle can receive the same type of signal generated in the rotating bundle.

DESCRIPTION OF THE PREFERRED EMBODIMENT

Figure 1:
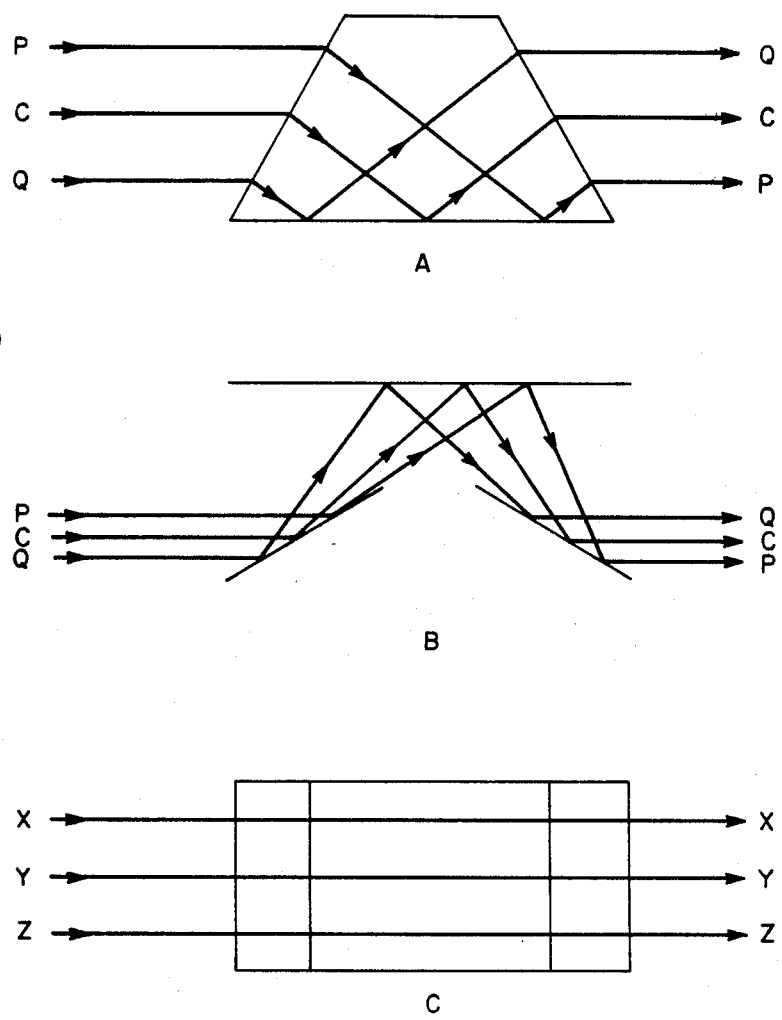
FIG. 1 shows prior art inversion optics.

FIG. 1 shows samples of well-known inversion optics. FIG. 1A is a ray trace diagram of a Dove prism. FIG. 1B is a ray trace diagram of a K mirror. Both of these devices have the property of inverting an optical image about a single center line axis shown by ray C. As shown, rays P and Q are inverted upon passing through the optics shown. P and Q can be treated as planes. FIG. 1C is a top view showing rays passing through the optics of FIG. 1A or 1B which are all in plane P. The rays are in the same sequence upon exiting the optics within plane P as they were upon entry. Plane Q and plane C also have no change of ray sequence within them.

Figure 2:
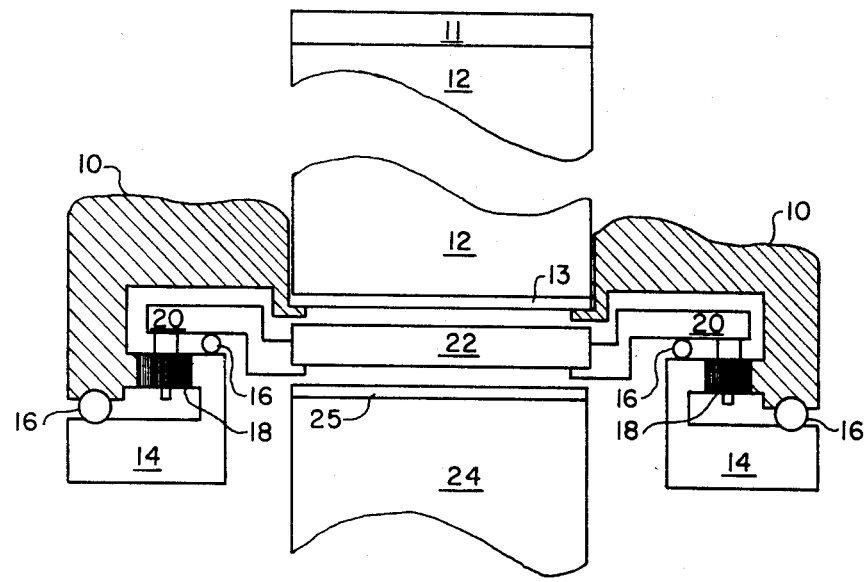
FIG. 2 is a cross-section of the preferred embodiment.

FIG. 2 shows a cross-section of the preferred embodiment. Member 10 is rotating. Bundle 12 is mounted within member 10 so that it rotates with the same angular speed as member 10. For simplicity, bundle 12 will be treated as circular. While any shape can be used, the effective working area of any spinning body will be circular. Bundle 12 is an array of information means. Possibilities include a fiber optic bundle, a bundle of electrical wires or an array of hydraulic tubing. The information transmitted by bundle 12 is generated by a signal generation means 11. Means 11 can be merely an entrance opening or lens for optical signals. A means 13 for transmitting information signals from bundle 12 is connected to the bottom of bundle 12. Member 10 travels over the stationary member 14 by means of ball bearings 16. By any of several well known gearing methods, member 10 turns gears 18 so as to drive the half-speed carrier 20 at half the rotational speed of member 10. A derotation plate 22 is mounted to half-speed carrier 20. Derotation plate 22 is configured to invert the signals from means 13 about a single axis. A receiving bundle 24, which is stationary, is composed of an array of signal receiving means 25 suitable for the type of signals transmitted through derotation plate 22. Bundle 24 can either process the signals received or transmit them for further processing.

Figure 3:
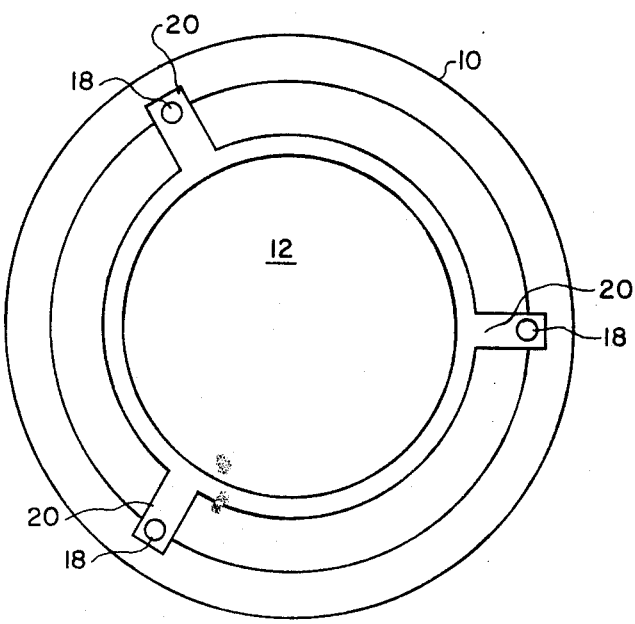
FIG. 3 is a top perspective of the preferred embodiment.

FIG. 3 shows a top perspective of FIG. 2. Member 10 now appears as the outer ring. Three gears 18 are shown as planetary gears. Bundle 12 is shown now as the small circle within half-speed carrier 20 which appears as ring 20. Derotation plate 22 is mounted within ring 20 and is covered in FIG. 3 by bundle 12. Similarly, receiving bundle 24 is masked by bundle 12 in FIG. 3.

Figure 4:
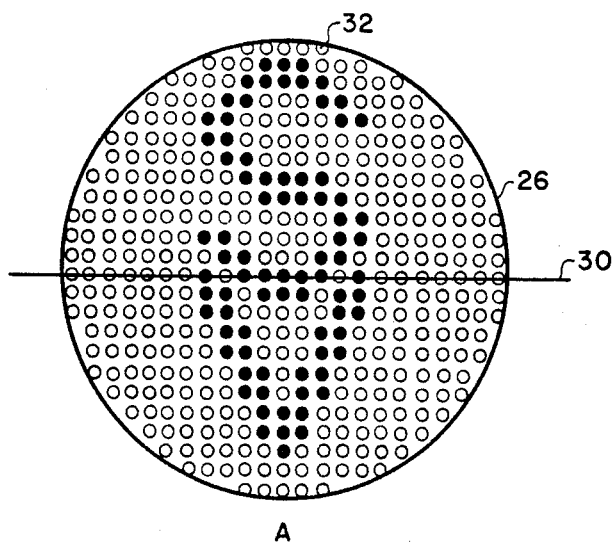
FIG. 4 is an expanded view of the signals projected onto the top surface as compared to signals projected from the bottom surface of a derotation plate.
Figure 4:
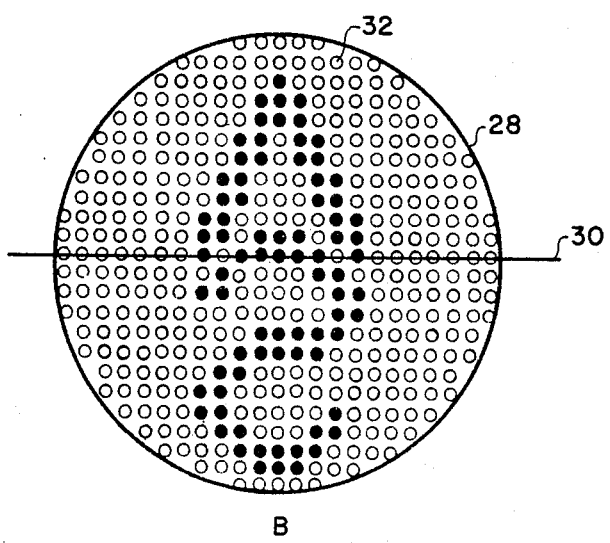
Figure 4:
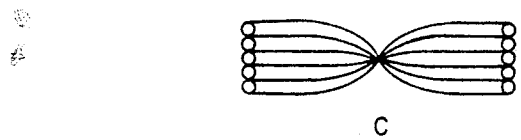

FIG. 4A shows the upper surface 26 of derotation plate 22. The axis 30 is the axis that plate 22 inverts about. The signal carriers 32 shown as circles can be either optical fibers, electrical wires or hydraulic tubing. Signal carriers 32 are shown receiving an arbitrary pattern represented by the solid circles. Signal carriers 32 invert along each row perpendicular to axis 30 and provide a projected image onto the upper surface 28 of receiving means 25. Each row of signal carriers 32 for optical signals can be a fiber optic ribbon which inverts by a single twist of the ribbon as shown in FIG. 4C. When the predetermined information is transmitted, only some carriers will actually be used at any given rotational angle. As can be seen in FIG. 4, the output image on surface 28 has an inverted pattern with respect to axis 30 from the pattern on surface 26.

Referring back to FIG. 2, it is clear that use of wires, optical fibers and tubing with the associated light emitters and detectors will serve as high density slip rings. Bundles 12 and 24 can be separated by an air gap from derotation plate 22 if optical signals are used. For electrical signals, brushes on bundles 12 and 24 will have to contact wire leads on plate 22. For hydraulic tubing, bundles 12 and 24 must have smooth surfaces in contact with plate 22. The design for hydraulics must be for a particular pressure application.

Figure 5:
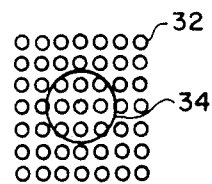
FIG. 5 shows the overlap of bundle transmitters and receivers on the derotation plate signal carriers.

FIG. 5 shows derotation plate 22 signal carriers 32 and a signal transmitter 34 from the array of transmitting means 13. Transmitter 34 can be either a light-emitting diode, optic fiber, brush or hydraulic tube depending on the nature of signal carriers 32. Assuming signal carriers 32 are optical fibers, transmitter 34 is either an optical fiber or light-emitting diode. As shown in FIG. 5, transmitter 34 covers a significantly larger area than an individual signal carrier 32. This provides a smooth transition in signal transmission as derotation plate 22 rotates. Similarly, the receiver size for receiving means 25 is an array of devices similar in size to transmitter 34.

Figure 6:
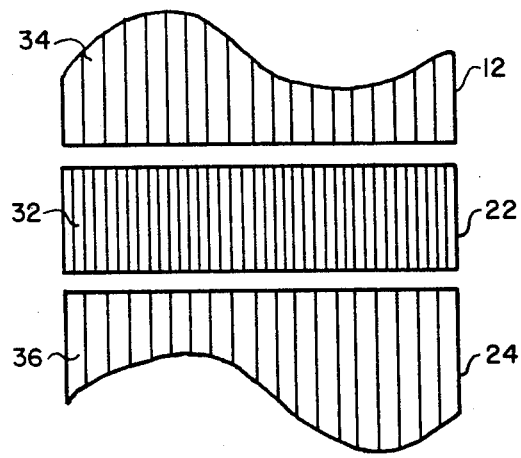
FIG. 6 shows the relative density of signal carriers between bundles by the derotation plate.

FIG. 6 is a cross section of bundles 12 and 24 as well as derotation plate 22. The relative size difference shown between transmitters 34 and signal carriers 32 is for example only. Receivers 36 are shown similar in size to transmitters 34.

Figure 7:
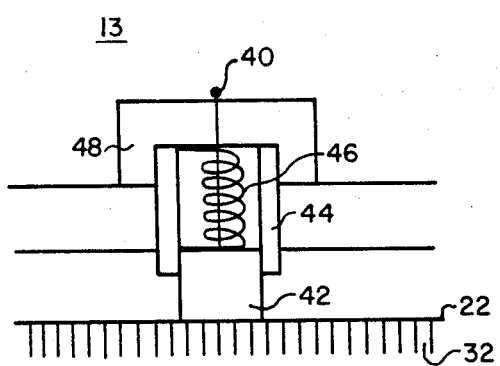
FIG. 7 shows a typical brush contact for electrical signals.

FIG. 7 is an example of the brush type of transmitting means 13 that can be used on the bottom surface of rotating bundle 12. A wire lead 40 carries a predetermined signal from or through rotating bundle 12. Wire 40 carries the signal to the brush 42 which is made of a conducting metal such as copper. Brush 42 is kept in contact with the surface of wire signal carriers 32 on derotation plate 22 by a spring 46. Spring 46 and brush 42 are kept properly aligned by a brush block 44. This assembly is contained by a cap 48. Brush 42 is always in contact with several signal carriers which in this case can be wires 32. To receive the inverted signal from derotation plate 22, a similar brush assembly can be used as a receiver for receiving means 25.

Figure 8:
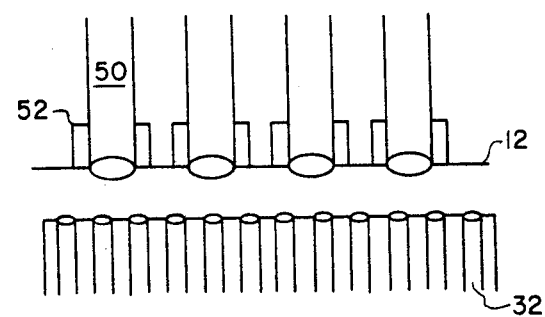
FIG. 8 shows optical coupling for electrical signals.

FIG. 8 shows that separate transmitting means 13 and receiving means 25 are not needed for signal coupling between optical fibers. Signal carriers 32 are now relatively small fiber optics. Bundle 12 is now composed of fiber optic strands 50 held in the surface of bundle 12 by ports 52. Ports 52 can be rubber tubes that provide a snug fit for strands 50 or any similar method including adhesion compounds. A similar port arrangement can be used for an array of hydraulic tubing.

Figure 9:
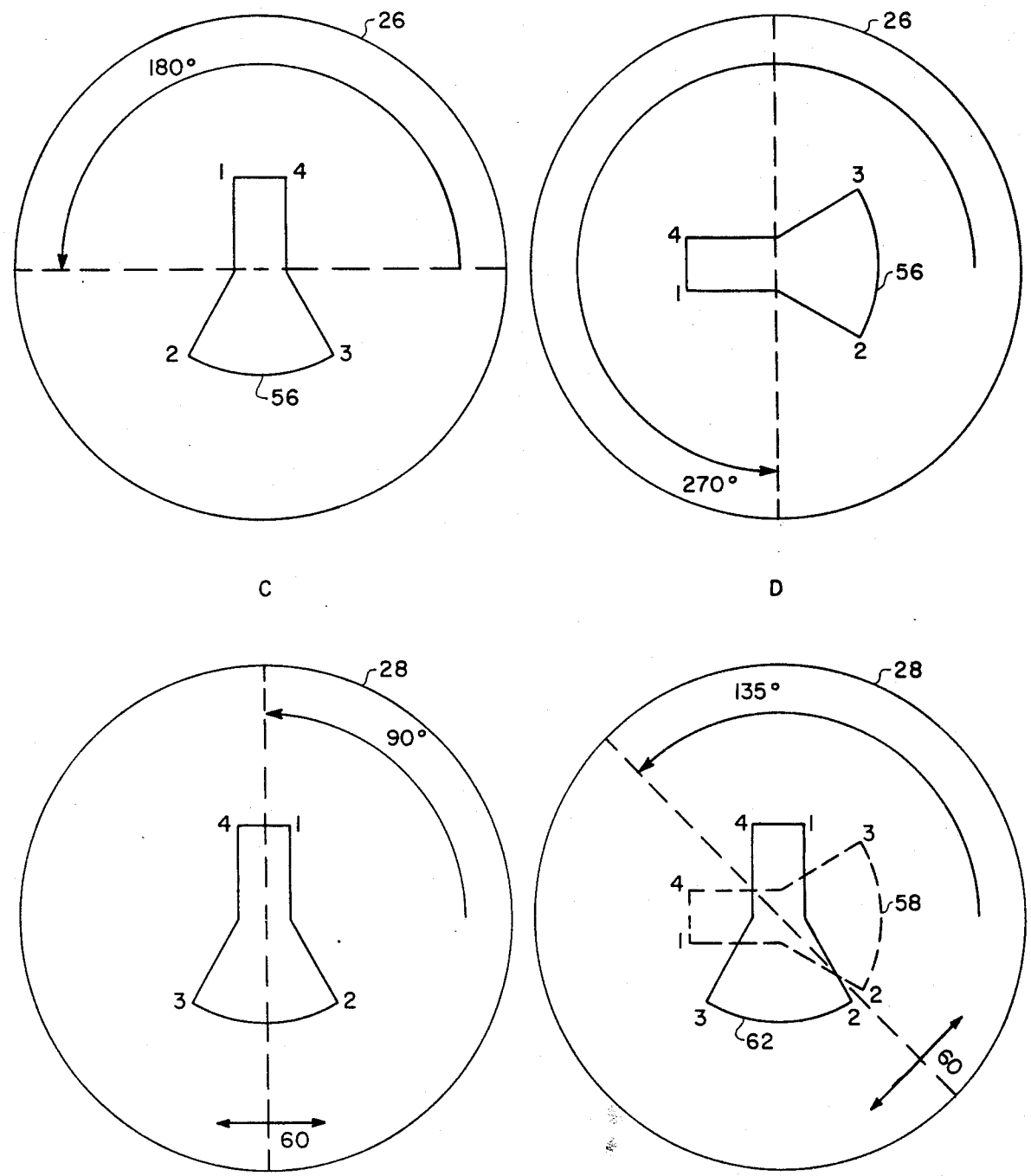
FIG. 9 shows how signal stability is accomplished.
Figure 9:
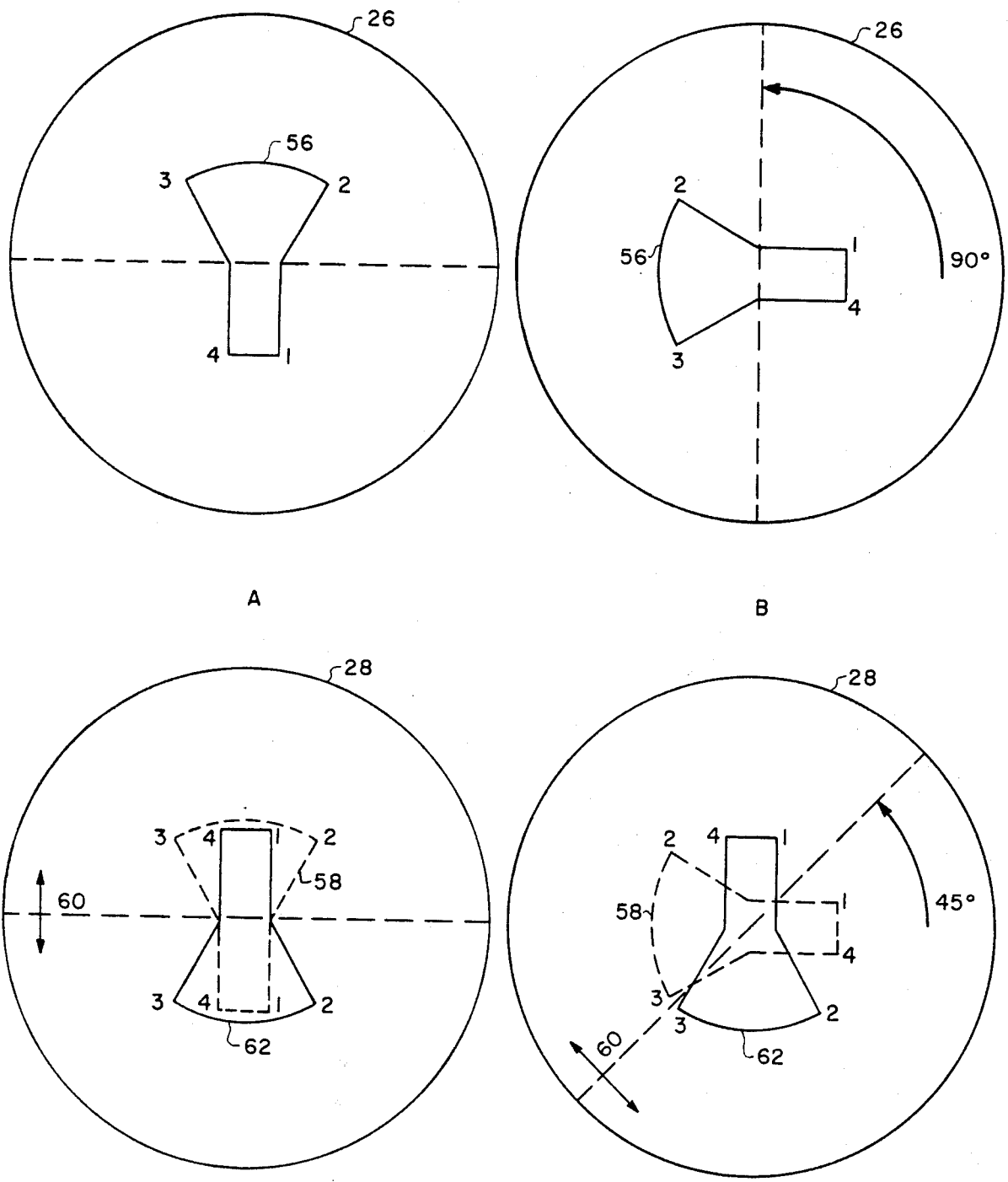

FIG. 9 shows how the rotating image 56 received on surface 26 of derotation plate 22 is converted to a stationary image on surface 28 of receiving means 25. Image 56 would appear as dotted image 58 if the image was not inverted about axis 60 to yield final image 62 as shown in FIG. 9A. In FIG. 9B, input image 56 has rotated 90°. The axis of inversion 60 on the derotation plate has rotated 45°. If the rotation plate did not have an inversion axis, the image would be as shown by image 58, but inversion about axis 60 gives final image 62 which is identical to that of FIG. 9A. Reference characters 1–4 are used to track specific points of image 56. FIGS. 9C and 9D are for a rotation of 180° and 270° respectively with the corresponding half rotation of axis 60.

What is claimed is:

1. An apparatus for transmitting signals between a rotating member and a stationary member comprising;
    generation means mounted in said rotating member for initiating a two-dimensional signal representative of a predetermined signal;
    a mounted bundle connected to said generation means for transmitting said two-dimensional signal;
    means for transmitting said signals from said rotating mounted bundle connected to said rotating mounted bundle;
    a half-speed carrier connected to said rotating member for converting said rotating member's rotation speed to half that rotation speed for said carrier;
    a derotation plate physically connected to the half-speed carrier so as to rotate at the same speed as said carrier and positioned to receive said transmitted signal from said rotating bundle, for transmitting an inverted signal from that received;
    means for receiving said inverted signal from said derotation plate connected to said stationary member; and
    a receiving bundle which is part of the stationary member and connected to said receiving means for processing said transmitted inverted signals from said receiving means.

2. An apparatus for transmitting signals as described in claim 1 wherein said transmission means in the rotating bundle is an array of light-emitting diodes.

3. An apparatus for transmitting signals as described in claim 1 wherein said transmission means is an array of ports containing optical fibers.

4. An apparatus for transmitting signals as described in claim 1 wherein said derotation plate comprises optical fibers patterned to function as a Dove prism by emitting a signal pattern that is inverted about a single axis from that inputted to said derotation plate.

5. An apparatus for transmitting signals as described in either claim 2, 3 or 4 wherein said receiving means comprises light image receiving means.

6. An apparatus for transmitting optical signals between a rotating member and a stationary member comprising:
    generation means within said rotating member for initiating a two-dimensional rotating electrical signal;
    a bundle of electrical wires connected to said generation means within said rotating member for carrying said electrical signals wherein said generation means and said bundle of wires rotate with said rotating member;

an array of light emitting diodes connected to said rotating bundle of wires for transmitting said rotating electrical signal as a rotating optical signal from said rotating bundle;

a half-speed carrier connected to said rotating member for converting said rotating member's speed to half that rotation speed for said carrier;

a derotation plate of optical fibers patterned to function as a Dove prism such that said optical signal is inverted about a sin gle axis, which is physically connected to the half-speed carrier so as to rotate at the same speed as said carrier and positioned so as to receive said light-emitting diode optical signals for transmittng optical signals inverted and nonrotating from that received;

light image receiving means which is part of the stationary member for receiving said transmitted nonrotating inverted optical signal from said derotation plate; and processing means connected to said light receiving means for displaying said inverted nonrotating signal.

7. An apparatus for transmitting optical signals between a rotating member and a stationary member comprising:

an entrance opening for receiving a predetermined optical signal;

a fiber optic bundle placed behind said entrance opening for carrying said optical signal, wherein said fiber optic bundle rotates with said rotating member, and terminates in a fixed array of ports for emission of a rotating optical signal;

a half-speed carrier connected to said rotating member for converting said rotating member's speed to half that rotation speed for said carrier;

a derotation plate of optical fibers patterned to function as a Dove prism such that said optical signal is inverted about a single axis, which is physically connected to the half-speed carrier so as to rotate at the same speed as said carrier and positioned so as to receive said light-emitting diode optical signals for transmitting optical signals inverted and nonrotating from that received;

light image receiving means which is part of the stationary member for receiving said transmitted nonrotating inverted optical signal from said derotation plate; and processing means connected to said light receiving means for displaying said inverted nonrotating signal.

8. An apparatus for transmitting optical signals between a rotating member and a stationary member as described in either claim 6 or 7 wherein said optical fibers of said derotation plate are smaller than the area of signal they receive from or transmit to such that a smooth signal transmission occurs.

9. An apparatus for transmitting optical signals as described in either claim 6 or 7 wherein said optical fibers of said derotation plate are ribbon fibers given a single twist to cause signal inversion.

10. An apparatus for transmitting optical signals as described in either claim 6 or 7 wherein said optical fibers of said derotation plate are arranged to be concentric rings which invert clockwise signals to counterclockwise signals.

* * * * *